United States Patent
Lafaye et al.

(10) Patent No.: US 10,293,486 B2
(45) Date of Patent: May 21, 2019

(54) OMNIDIRECTIONAL WHEELED HUMANOID ROBOT BASED ON A LINEAR PREDICTIVE POSITION AND VELOCITY CONTROLLER

(71) Applicants: SOFTBANK ROBOTICS EUROPE, Paris (FR); INSTITUT NATIONAL DE RECHERCHE EN INFORMATIQUE ET EN AUTOMATIQUE, Rocquencourt (FR)

(72) Inventors: Jory Lafaye, Paris (FR); David Gouaillier, St Jean De Boiseau (FR); Pierre-Brice Wieber, Grenoble (FR)

(73) Assignees: SOFTBANK ROBOTICS EUROPE, Paris (FR); INSTITUT NATIONAL DE RECHERCHE EN INFORMATIQUE ET EN AUTOMATIQUE, Rocquencourt (FR)

( * ) Notice: Subject to any disclaimer, the term of this patent is extended or adjusted under 35 U.S.C. 154(b) by 0 days.

(21) Appl. No.: 15/300,218

(22) PCT Filed: Apr. 17, 2015

(86) PCT No.: PCT/EP2015/058367
§ 371 (c)(1),
(2) Date: Sep. 28, 2016

(87) PCT Pub. No.: WO2015/158884
PCT Pub. Date: Oct. 22, 2015

(65) Prior Publication Data
US 2017/0144306 A1    May 25, 2017

(30) Foreign Application Priority Data
Apr. 17, 2014  (EP) .................................. 14305584

(51) Int. Cl.
*G06F 19/00*  (2018.01)
*B25J 9/16*  (2006.01)
(Continued)

(52) U.S. Cl.
CPC ............. *B25J 9/1669* (2013.01); *B25J 5/007* (2013.01); *B25J 9/1628* (2013.01); *G05D 1/0891* (2013.01); *G05D 2201/0217* (2013.01)

(58) Field of Classification Search
CPC ....... B25J 9/1669; B25J 5/007; G05D 1/0891; G05D 2201/0217
See application file for complete search history.

(56) References Cited

U.S. PATENT DOCUMENTS

| | | | | |
|---|---|---|---|---|
| 2008/0085048 | A1* | 4/2008 | Venetsky | ........... G06K 9/00355 382/153 |
| 2012/0029696 | A1* | 2/2012 | Ota | ......................... A61H 3/04 700/250 |

OTHER PUBLICATIONS

A. Mills et al., "Nonlinear model predictive control of an inverted pendulum," American Control Conference, Jun. 10, 2009, pp. 2335-2340, XP031486943.
(Continued)

*Primary Examiner* — Ian Jen
(74) *Attorney, Agent, or Firm* — Baker & Hostetler LLP

(57) ABSTRACT

A humanoid robot with a body joined to an omnidirectional mobile ground base, and equipped with: a body position sensor and a base position sensor to provide measures, actuators comprising at least 3 wheels located in the omnidirectional mobile base, extractors for converting the measures into useful data, a controller to calculate position, velocity and acceleration commands from the useful data using a robot model and pre-ordered position and velocity references, means for converting the commands into instructions for the actuators, wherein the robot model is a double point-mass model, and wherein the commands are based on
(Continued)

a linear model predictive control law with a discretized time according to a sampling time period and a number of predicted samples, and expressed as a quadratic optimization formulation with: a weighted sum of objectives and a set of predefined linear constraints.

7 Claims, 5 Drawing Sheets

(51) Int. Cl.
    *B25J 5/00*     (2006.01)
    *G05D 1/08*     (2006.01)

(56) References Cited

OTHER PUBLICATIONS

Guy Bessonnet et al., "Forced Acting on a Biped Robot. Center of Pressure-Zero Moment Point," IEEE Transactions on Systems, Man and Cyberntetics, Part A: Systems and Humans, vol. 34, No. 5, Sep. 2004.
Teck Chew Wee, "Mechanical design and optimal control of humanoid robot (TPinokio)," The Journal of Engineering, Apr. 10, 2014, XP055152461.
Andrei Herdt et al., "Walking without thinking about it," Proceedings of the IEEE/RSJ International Conference on Intelligent Robots and Systems, Nov. 2010.
David Gouaillier et al., "Omni-directional Closed-loop Walk for NAO," 2010 IEEE-RAS International Conference on Humanoid Robots, Dec. 6-8, 2010, pp. 448-454.

\* cited by examiner

OMNIDIRECTIONAL WHEELED HUMANOID ROBOT BASED ON A LINEAR PREDICTIVE POSITION AND VELOCITY CONTROLLER

CROSS-REFERENCE TO RELATED APPLICATIONS

This application is a National Stage of International patent application PCT/EP2015/058367, filed on Apr. 17, 2015, which claims priority to foreign European patent application No. EP 14305584.6, filed on Apr. 17, 2014, the disclosures of which are incorporated by reference in their entirety.

FIELD OF THE INVENTION

The present invention relates to the field of robot programming systems. More specifically, it applies to the controlling of motions of robots which move around on articulated limbs or use them, notably robots of human or animal form. A robot can be qualified as humanoid from the moment when it has certain human appearance attributes: a head, a trunk, two arms, two hands, etc. A humanoid robot may, however, be more or less sophisticated. Its limbs may have a greater or lesser number of articulations. It may control its own balance statically and dynamically and roll over a base. It may pick up signals from the environment ("hear", "see", "touch", "sense", etc.) and react according to more or less sophisticated behaviors, and interact with other robots or humans, either by speech or by gesture. For a current generation of humanoid robots, programmers are capable of creating scenarios, which can be more or less sophisticated, as sequences of events/actions reacted to/performed by the robot. These actions can be conditional upon certain behaviors of people who interact with the robot. But in these humanoid robots of the first generation, application programming is done in a development toolkit and each application needs to be launched by a triggering event, the occurrence of which has been included in the application.

There is therefore a need for a humanoid robot capable of living an "autonomous life", as a human being does, who is capable of behaving in a determined manner, depending on the environment he is evolving in. It is an object of the present invention to overcome the limitations of the robots of the prior art by providing a robot who is capable of determining autonomously sequences of its life adapted to the context it is evolving in, without any intervention of a programmer.

BACKGROUND

We consider a robot with a mobile base joined to a body, also called upper body.

The normal forces acting by the wheels of the mobile base on the ground are strongly dependant of the position and acceleration of its body. So the mobile base suffers of strong slippages. Also, due to the important height of the robot in comparison with its support base dimension, the robot can easily fall.

In the literature, some papers can be found about the control of a mobile robot with dynamic stability constraints, and about the control of humanoid two-legged robots.

Some recent works deal with controlling a robot with dynamical constraints, caused by limbs such as manipulator arm. K. Mingeuk and al. have worked on the stabilization of a wheeled platform using dynamic constraints: "Stabilization of a rapid four-wheeled mobile platform using the zmp stabilization method". They use a direct linear quadratic regulator (LQR) method to control the platform. The inconvenient of this method is that the submitted dynamic constraints require having the CoP (Center of Pressure) on the middle of the platform. The CoP is the barycenter of the contact forces between the robot and the ground. This method involves losing several DoF (Degree of Freedom): indeed, to prevent a robot from falling, the CoP needs to be only in the convex polygon defined by the contact points between the wheels and the ground.

In another paper, Y. Li and al. present a simple controller of a mobile robot with dynamic constraints: "The dynamic stability criterion on the wheel-based humanoid robot based on zmp modeling". The difference with the K. Mingeuk and Al. publication is that it takes into account the full CoP constraint, which is a sum of inequality constraints. This controller is a pid-control iterated on a complete model of the robot to find a torque command where the CoP is in the support polygon.

Concerning humanoid robotics, P. B. Wieber, H. Diedam and A. Herdt have described a method to control humanoid two-legged robot with highly constrained dynamic: "Walking without thinking about it". This most recent approach concerns the linear predictive control based on a 3d linear inverted pendulum model. Using a simple model of the robot, this control law predicts the dynamic of its state in the future, in order to ensure that the current command sent to the robot will not cause an inevitable fall in a few seconds. Concerning the biped humanoid robot NAO, an implementation of this control law can be found in a paper written by D. Gouaillier, C. Collette and K. Kilner: "Omni-directional closed-loop walk for nao". But the robot NAO is small and this method would not give good results notably for a higher humanoid robot as shown FIG. 1, for instance with the following features:

20 Degrees of freedom (DoF) (2 DoF on the head 160, 2×6 DoF on the arms 170, 3 DoF on the leg 180 and 3 DoF in the mobile base 140); indeed a humanoid robot has at least 5 DoF (1 DoF for the head, 1 for each leg, 1 for each arm), 1.37 m height 110, 0.65 m width 130, 0.40 m depth 120, 30 kg total mass, one leg 180 linked to the omnidirectionnal base 140 with three wheels 141. The mobile base has a triangular shape of 0.422 m length and is able to move the robot at a maximum velocity of 1:4 m/s$^{-1}$ and acceleration of 1:7 m/s$^{-2}$ for a short time. The nominal velocity and acceleration are 0:5 m/s$^{-1}$ and 1:0 m/s$^{-2}$.

A solution is to design a robot with a large omnidirectionnal base compared to the height of the robot; but then we have the following drawbacks: an overdue required space and a weakness of the robot's body.

There is therefore a need for controlling both the mobile base of a humanoid robot and its body, while taking into account their dynamical constraints.

SUMMARY OF THE INVENTION

To this effect, the invention provides a humanoid robot with a body joined to an omnidirectionnal mobile ground base, and equipped with:

a body position sensor and a base position sensor to provide measures, actuators comprising joints motors and at least 3 wheels located in the omnidirectionnal mobile base, with at least 1 omnidirectional wheel, means for converting the measures into useful data,
a controller to calculate position, velocity and acceleration commands from the useful data using a robot model and pre-ordered position and velocity references,
means for converting the commands into instructions for the actuators.

It is mainly characterized in that the robot model is a double point-mass model, and in that the commands are based on a linear model predictive control law with a discretized time according to a sampling time period and a number of predicted samples, and expressed as a quadratic optimization formulation with:
  a weighted sum of:
    a base position objective,
    a base velocity objective,
    an objective related to the distance between the CoP and the base center, CoP being the barycenter of contact forces between the robot and the ground, with predefined weights and,
  a set of predefined linear constraints which are:
    a maximum velocity and acceleration of the mobile base,
    kinematic limits of the body,
    a CoP limit.

Such a robot is able to control both the mobile base of the robot and its body, while taking into account the dynamical constraints. It makes it possible to have high velocity and acceleration motion by predicting dynamical model behavior of the robot in the future.

The advantages of the controller are:
  the concept of time-prediction, which allows high constrained dynamic system to be controlled at high speed and acceleration, predicting future behaviors;
  the high modularity which allows many choices among prioritizing the trajectory tracking, optimizing the robustness if the robot is severely disrupted, or minimizing the jerk to protect the mechanical parts of the robot;
  the possibility to manage any set of linear constraint as kinematic limits, stability or robustness limitations, and mobile base limitations.

Advantageously a weighted numerical stability objective is added to the weighted sum of objectives.

The kinematic limits of the body can be null.

According to an embodiment of the invention, at least a wheel is omnidirectionnal.

Advantageously the ground is planar and horizontal.

The invention also provides a method for controlling a humanoid robot with a body joined to an omnidirectionnal mobile ground base and actuators comprising at least 3 wheels located in the omnidirectional mobile base and with at least 1 omnidirectional wheel, comprising the following steps implemented according to a closed-loop scheme:
  retrieving position measure of the body and position measure of the base,
  converting these position measures in observed (or useful) position measures,
  calculating body velocity and base velocity commands using a control law based on a linear model predictive control law with a discretized time according to a sampling time period and a number of predicted samples, and expressed as a quadratic optimization formulation with a weighted sum of:
    a base position objective,
    a base velocity objective,
    an objective related to the distance between the CoP and the base center, CoP being the barycenter of contact forces between the robot and the ground, with predefined weights and a set of linear constraints which are:
      a maximum velocity and acceleration of the mobile base,
      kinematic limits of the body,
      a CoP limit,
      converting these commands into instructions for the robot actuators.

The invention also provides a computer program comprising computer code fit for executing when running on a computer the method of previous claim.

BRIEF DESCRIPTION OF THE DRAWINGS

The invention will be better understood and its various features and advantages will emerge from the following description of a number of exemplary embodiments and its appended figures in which.

From a figure to another one, the same elements are tagged with the same references.

DETAILED DESCRIPTION

Figure 1:
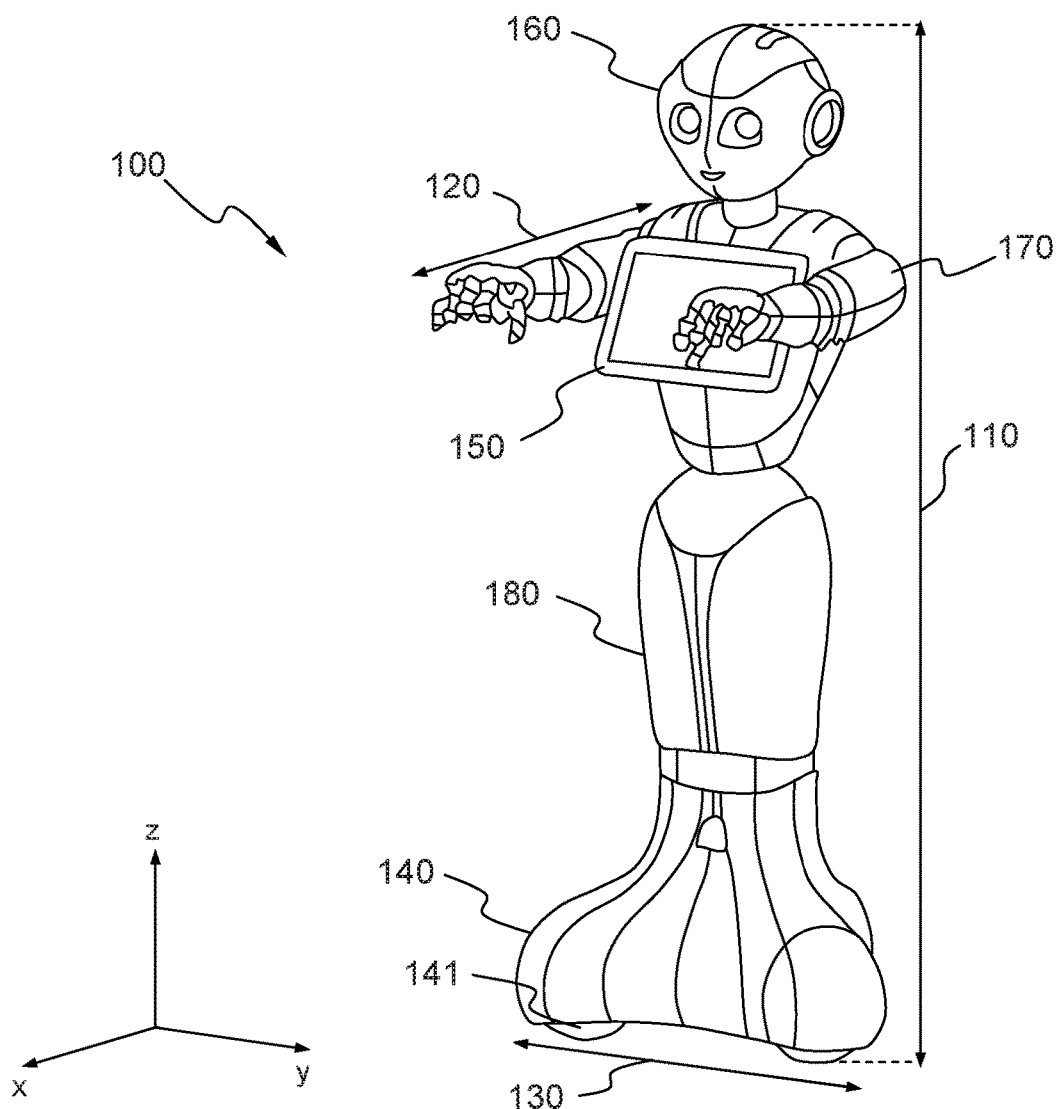
FIG. 1 displays a physical architecture of a humanoid robot in a number of embodiments of the invention.

FIG. 1 displays a physical architecture of a humanoid robot in a number of embodiments of the invention.

The specific robot 100 on the figure is taken as an example only of a humanoid robot in which the invention can be implemented. The lower limb 180 of the robot on the figure is not functional for walking, but can move in any direction on its base 140 which rolls on the surface on which it lays. By way of example, this robot has a height 110 which can be around 120 cm, a depth 120 around 65 cm and a width 130 around 40 cm. In a specific embodiment, the robot of the invention has a tablet 150 with which it can communicate messages (audio, video, web pages) to its environment, or receive entries from users through the tactile interface of the tablet. In addition to the processor of the tablet, the robot of the invention also uses the processor of its own motherboard, which can for example be an ATOM™ Z530 from Intel™. The robot of the invention also advantageously includes a processor which is dedicated to the handling of the data flows between the motherboard and actuators which control the motors of the joints in a limb and the balls that the robot uses as wheels, in a specific embodiment of the invention. The motors can be of different types, depending on the magnitude of the maximum torque which is needed for a definite joint. For instance, brush DC coreless motors from e-minebea™ (SE24P2CTCA for instance) can be used, or brushless DC motors from Maxon™ (EC45_70W for instance). The MREs are preferably of a type using the Hall effect, with 12 or 14 bits precision.

In embodiments of the invention, the robot displayed on FIG. 1 also comprises various kinds of sensors. Some of them are used to control the position and movements of the robot. This is the case, for instance, of an inertial unit, located in the torso of the robot, comprising a 3-axes gyrometer and a 3-axes accelerometer. The robot can also include two 2D color RGB cameras on the forehead of the robot (top and bottom) of the System On Chip (SOC) type, such as those from Shenzen V-Vision Technology Ltd™ (OV5640), with a 5 megapixels resolution at 5 frames per second and a field of view (FOV) of about 57° horizontal and 44° vertical. One 3D sensor can also be included behind the eyes of the robot, such as an ASUS XTION™ SOC sensor with a resolution of 0.3 megapixels at 20 frames per second, with about the same FOV as the 2D cameras. The robot of the invention can also be equipped with laser lines generators, for instance three in the head and three in the base, so as to be able to sense its relative position to objects/beings in its environment. The robot of the invention can also include microphones to be capable of sensing sounds in its environment. In an embodiment, four microphones with a sensitivity of 300 mV/Pa+/−3 dB at 1 kHz and a frequency range of 300 Hz to 12 kHz (−10 dB relative to 1 kHz) can be implanted on the head of the robot. The robot of the invention can also include two sonar sensors, possibly located at the front and the back of its base, to measure the distance to objects/human beings in its environment. The robot can also include tactile sensors, on its head and on its hands, to allow interaction with human beings.

To translate its emotions and communicate with human beings in its environment, the robot of the invention can also include:
LEDs, for instance in its eyes, ears and on its shoulders;
Loudspeakers, for instance two, located in its ears.

The robot of the invention may communicate with a base station or other robots through an Ethernet RJ45 or a WiFi 802.11 connection.

The robot of the invention can be powered by a Lithium Iron Phosphate battery with energy of about 400 Wh. The robot can access a charging station fit for the type of battery included.

Position/movements of the robot are controlled by its motors, using algorithms which activate the chains defined by each limb and effectors defined at the end of each limb, in view of the measurements of the sensors.

Figure 2:
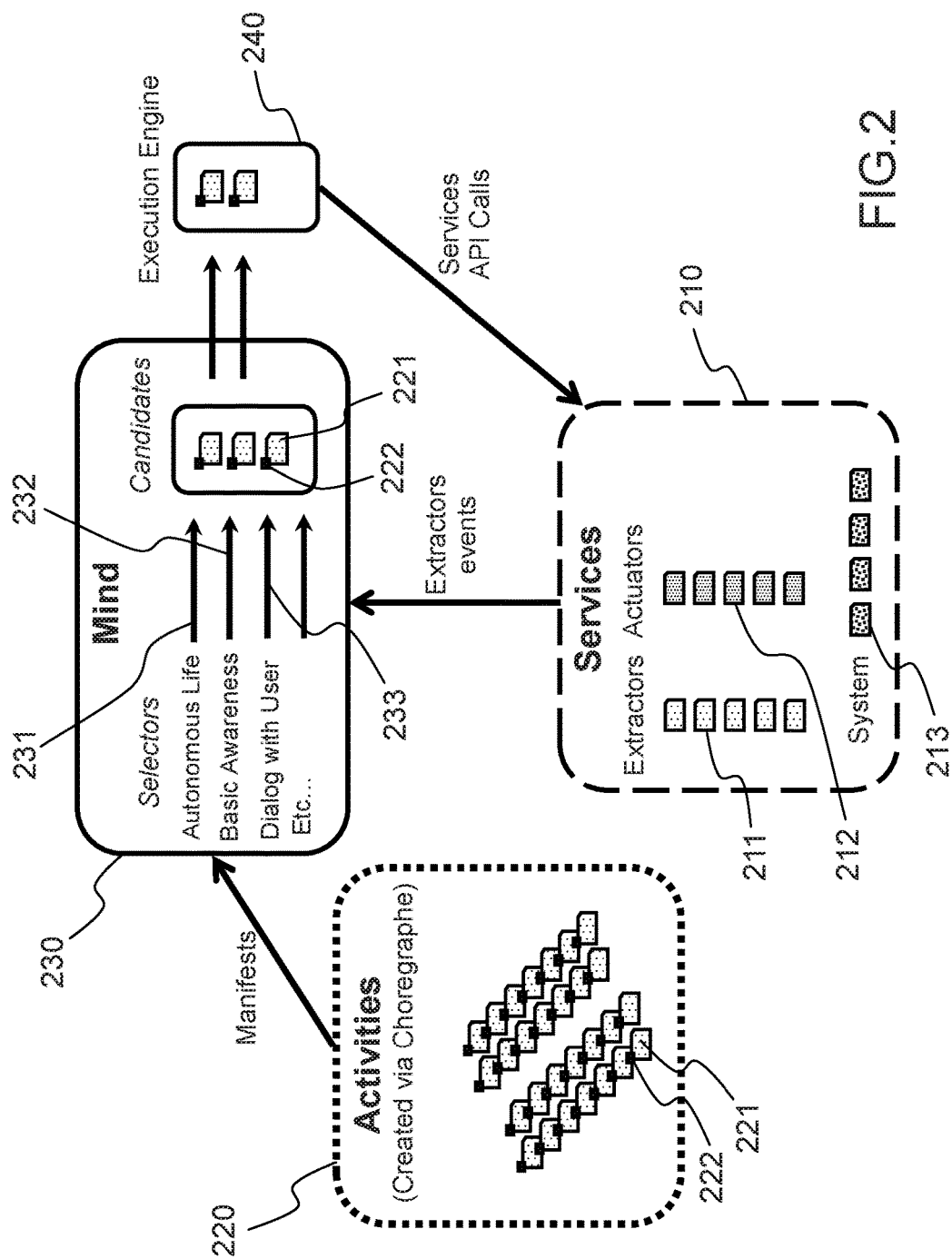
FIG. 2 displays a functional architecture of the software modules of a humanoid robot in a number of embodiments of the invention.

FIG. 2 displays a functional architecture of the software modules of a humanoid robot in a number of embodiments of the invention.

The goal of the invention is to provide a method to allow a humanoid robot to perform activities in an autonomous way, without any intervention of a programmer to anticipate the conditions that the robot will face. In the prior art, the robot is capable of executing scenarios which have been programmed and uploaded to its motherboard. These scenarios can include reactions to conditions which vary in its environment, but the robot will not be capable to react to conditions which have not been predicted and included in the code uploaded to its motherboard or accessed distantly. In contrast, the goal of the invention is to allow the robot to behave autonomously, even in view of events/conditions which have not been predicted by a programmer. This goal is achieved by the functional architecture which is displayed on FIG. 2.

This functional architecture comprises in essence four main software modules.

A Services module 210 includes services of at least three types:

Extractor Services 211, which receives as input readings from the robot sensors of the type described in relation with FIG. 1; these sensor readings are preprocessed so as to extract relevant data (also said useful data) in relation to the position of the robot, identification of objects/human beings in its environment, distance of said objects/human beings, words pronounced by human beings or emotions thereof; example of Extractor Services are: People Perception to perceive the presence of human beings in the vicinity of the robot, Movement Detection to detect the movements of these human beings; Sound Localization to locate a sound, Touch Detection to interpret a touch on a robot tactile sensor, Speech Recognition, Emotion Recognition, to identify the emotion expressed by a human being in the vicinity of the robot, through its words or gestures;

Actuator Services 212, which control physical actions of the robot such as Motion to activate the motors of the joints or the base, Tracker to follow motion of a human being in the environment of the robot, lighting of the robot's LEDs to communicate emotions, Animated Speech (combinations of speech and gestures), Behaviors; behaviors are a combination of movements, words, lightings which may express emotions of the robot and allow it to perform complex actions;

System Services 213, which notably include Data Services; Data Services provide stored data, either transiently or long-term; examples of Data Services are:
User Session Service, which stores user data, and their history of what they have done with the robot;
Package Manager Service, which provides a scalable storage of procedures executed by the robot, with their high level definition, launch conditions and tags.

An Activities module 220 includes behaviors 221 of the robot which have been preprogrammed. The programming of the Behaviors can be effected using a graphical integrated development environment (Choregaphe™) which is the object of a European patent application published under no EP2435216, which is assigned to the applicant of this patent application. Behaviors programmed with Choregaphe™ combine a time based logic and an event based logic. Each Behavior is tagged with a Manifest 222, which is a text file including notably the launch conditions of the Behavior. These launching conditions are based on what the extractors 211 are able to perceive.

A Mind module 230 is in charge of selecting one or several Activities to launch. To do so, the Mind subscribes to the Extractors and evaluates the launching conditions of all the installed Activities. The variables of these conditions are event based. So, efficiently, only the condition statements containing changed variables need to be reevaluated. Based on the results of the sorting algorithm, its priorities, and the life cycle (see below), Activities may be launched, and some Activities possibly stopped.

An executed Activity will rely on API (acronym of the French expression "Application Pour Interface") calls to the Services to perform the task it has been programmed to do. Whenever an Activity is on stage or stopped, the Mind collects data about when this happened, the current state of conditions, and what the user feedback seemed to be to facilitate learning.

If an existing Extractor event is not sufficient for the conditions, developers can create an additional Extractor to generate a new event, and distribute it in a package with their application.

To do so, the Mind module 230 ties together the Services and the Activities modules by controlling the selection of the Activities, and launching the Actuators based on the readings of the Extractors and on algorithms performed in the Mind called Selectors. Examples of Selectors are:

Autonomous Life 231, which executes Activities; based on the context of a situation, the Mind can tell Autonomous Life on which activity to focus (see examples below); any Activity has full access to all call procedures of the module API; Activities can include a constraint which will direct Autonomous Life to focus on a definite Activity;

Basic Awareness 232, which subscribes to Extractor Services such as People Perception, Movement Detection, and Sound Localization to tell the Motion Service to move; the Mind configures Basic Awareness's behavior based on the situation; at other times, Basic Awareness is either acting on its own, or is being configured by a running Activity;

Dialog 233, which subscribes to the Speech Recognition Extractor and uses Animated Speech Actuator Service to speak; based on the context of a situation, the Mind can tell the Dialog what topics to focus on; metadata in manifests tie this information into the mind; Dialog also has its algorithms for managing a conversation and is usually acting on its own.

An Execution Engine 240 launches the API calls to invoke the Services.

The goal of the invention is more specifically oriented to position, velocity and balance controlling of a humanoid robot, while taking into account its dynamical constraints.

According to the invention, to allow high velocities and accelerations of the base 140 and the upper body 190 simultaneously, and without losing the robot's balance, we need to predict stability of the trajectory in the future. Moreover, the opportunity to know in advance the trajectory planning directly in the control law, makes the trajectory-tracking much more efficient.

The invention is founded on a control law based on model predictive control theory. The main advantage of this type of controller is to take into account the future to decide the next command sent to the robot. This is useful because in high constrained systems, such as the dynamic of this robot, we cannot be sure that the robot will be able to conserve its stability (or balance) with only an estimation of the current state.

Figure 3:
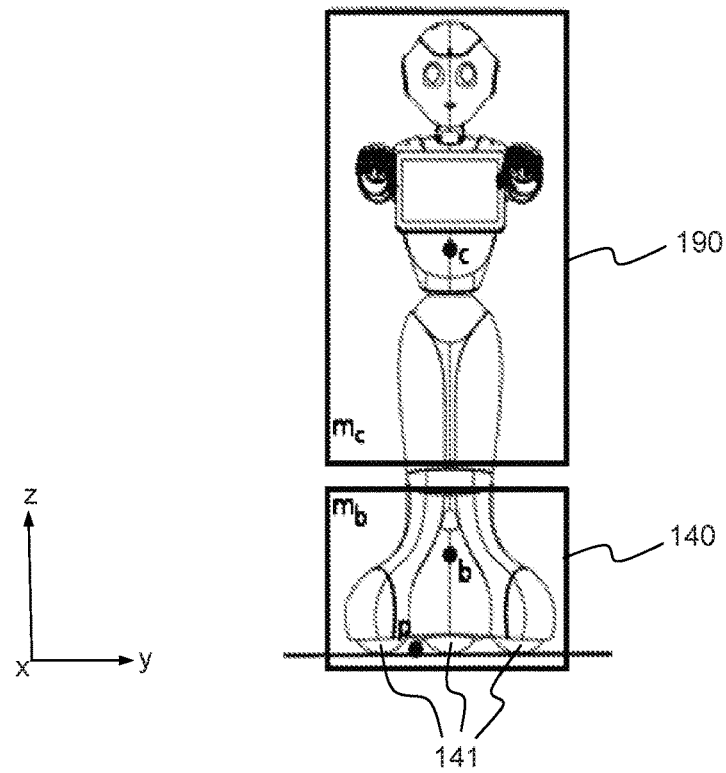
FIG. 3 displays a modelization of the mass repartition of a robot designed according to the invention.

The robot is modeled as a double point-mass model as shown FIG. 3. The first point-mass b represents the mobile base Center of Mass (CoM), and the second point-mass c represents the upper body CoM; the joint between the mobile base 140 and the body (or upper body) 190 is considered as having no mass. This model is stored as a system data-service 213.

In order to have a real-time control, the model of the robot needs to be as simple as possible. We need to compute a good approximation of the forces acting by the base on the ground. The repartition of the masses in the robot cannot be done by a single point-mass model, because around half of the mass is concentrated in the base, and the rest in the upper body.

We can now write the equations of Newton and Euler for this system, where the axis z is the vertical axe and, x and y the two horizontal axes:

$$m_c(\ddot{c}+g)=F_{b/c} \qquad (1)$$

$$m_b(\ddot{b}+g)=F_{g/b}-F_{b/c} \qquad (2)$$

$$\dot{L}_c=(b-c)\times F_{b/c} \qquad (3)$$

$$\dot{L}_b=(p-b)\times F_{g/b} \qquad (4)$$

where $m_c$ and $m_b$ are the masses respectively linked to c and b, $\dot{L}_c$ and $\dot{L}_b$ the angular momentums for each point-mass. $F_{b/c}{}^{xyz}$ corresponds to the forces acting by the mobile base on the upper body and $F_{g/b}{}^{xyz}$ corresponds to the forces acting by the ground on the three wheels of the mobile base.

Also, p is the CoP of the forces $F_{g/b}{}^{xyz}$, which is the barycenter of them. Due to its definition, p is only defined in the convex polygon represented by the contact points of the three wheels.

In this model, (1) and (2) directly implies that the distance between b and c is not constant.

And in this model, we consider directly the momentums between c and b (3)(4). This implies that we neglect the momentum induced by the arms. We can do that because in our cases of operation, there are not moving fast. Combining the equations (1)(2)(3)(4), we can write the dynamic equation of the system:

$$\dot{L}_c+\dot{L}_b=(p-b)\times m_b(\ddot{b}+g)+(p-c)\times m_c(\ddot{c}+g) \qquad (5)$$

We can note in the equation (5) that the dynamic equation of a two mass model is simply the sum of two single ones.

Now, in order to linearize the equation (5), we formulate some hypotheses. Firstly, we can neglect the total angular momentum $\dot{L}_c+\dot{L}_b$ because we have chosen to consider only the momentum between c and b. Secondly, because we have a redundant robot, we can move the CoM of c around the axes x and y without modifying its position on the axis z. So we consider $c^z$ constrained at a constant value h; this hypothesis is important to obtain a linear model but the robot can still roll over its base without this hypothesis. Moreover to simplify the description, we preferably consider a planar and horizontal ground, so $p^z=0$, but the robot can move without this hypothesis. There is no DoF to control the position of $b^z$, we can set it to a constant l. Finally, we can note that $g^x=g^y=0$ and $g^z=g$ the gravity norm.

Using these hypotheses and notes, we can rewrite the equation (5) as follows:

$$m_cg(c^{xy}-p^{xy})+m_bg(b^{xy}-p^{xy})=m_ch\ddot{c}^{xy}+m_bl\ddot{b}^{xy} \qquad (6)$$

We can now use the equation (6) in order to provide a linear relation between the CoP and the positions and accelerations of the base and of the body:

$$p^{xy}=\frac{m_cc^{xy}+m_bb^{xy}}{m_c+m_b}-\frac{m_ch\ddot{c}^{xy}+m_bl\ddot{b}^{xy}}{(m_c+m_b)g} \qquad (7)$$

It is interesting to see that the CoP of a two mass model is not the weighted barycenter of the two one-mass CoP, due to the terms h and l. The only way to consider such an approximation is to define h=l, and so no momentum between c and b is possible. We can conclude that this difference between a two-mass model CoP and the barycenter of two one-mass model CoP corresponds to the effect of the momentum between c and b.

A robustness criteria is used too to determine the robot model. We consider $\mathbb{D}$, the convex polygon represented by the contact point of each wheel with the ground; an example of this D polygon is shown FIG. 4. By definition, we always have $p^{xy}\in\mathbb{D}$. To have a CoP constraint invariant by rotation, in the frame of the robot centered on b, we have designed a conservative constraint: $p^{xy}\in\mathbb{D}'$, where $\mathbb{D}'$ is a circle centered on b of radius r, with the property $\mathbb{D}'\in\mathbb{D}$.

Quantifying the robustness of this system is an open question. In the absence of any modelization of the disturbance forces, we cannot make any hypothesis about the direction, the amplitude and their dynamics. The capacity of the robot to compensate a disturbance can be linked to the CoP and the CoM position of c. As they are able to move, the robot can react to a strong disturbance. We can note that, in the absence of any hypothesis on the disturbance, the CoP and the CoM position of c have the most range to move in any direction if they are close to b. So we propose a robustness criteria $\zeta$, which is equal to 0 on the maximum robustness:

$$\zeta = \zeta_f \|p-b\| + (1-\zeta_f)\|c-b\| \quad (8)$$

where $\zeta_f$ is a factor in the range [0; 1] which determines what type of robustness we consider most important, to center the CoP, or to center the CoM of c.

The robot model being defined, we can address the control law. This control law is stored for instance as a system data-service 213 which calls for the Motion API.

In order to define the dynamic behavior of the controlled body and base (c and b), we have to choose first the duration of the prediction (horizon) and the period between each sampling instant. Choosing a horizon as small as possible and a period as large as possible will reduce the computational time, but will also reduce the stability and the robustness of the control, depending on the dynamic class.

To conserve the linearity of the system, we have chosen a polynomial class of order 3 for the body and base trajectories to have a continuous CoP trajectory, in order to avoid peak of forces in the robot. Also, in this controller, the time is sampled, with a sampling period T. The number of predicted sample is N.

Another advantage of this kind of control is that it is simple to manage with many inequalities constraints, as kinematic limits of the robot, maximum velocity and acceleration of the mobile base and CoP limits.

We can write the relation between each state, using the Euler explicit method:

$$c_{k+1}^{xy} = c_k^{xy} + T\dot{c}_k^{xy} + \frac{T^2}{2}\ddot{c}_k^{xy} + \frac{T^3}{6}\dddot{c}_k^{xy} \quad (9)$$

$$\dot{c}_{k+1}^{xy} = \dot{c}_k^{xy} + T\ddot{c}_k^{xy} + \frac{T^2}{2}\dddot{c}_k^{xy} \quad (10)$$

$$\ddot{c}_{k+1}^{xy} = \ddot{c}_k^{xy} + T\dddot{c}_k^{xy} \quad (11)$$

There is an important consequence in the choice of the sampling period T. The trajectory is allowed to be out of the constraints between two samples, because we constrain the trajectory only at each sampling time. For real-time reason, we cannot choose a value for T too small. So it is necessary to take into account this overflow in each constraint as a security margin.

Consider $C^{xy}=(c_1^{xy} \ldots c_N^{xy})^t$, and in the same way for the derivatives of c and for b and p. Also, consider the initial state $\hat{c}^{xy}=(c_0^{xy}\ \dot{c}_0^{xy}\ \ddot{c}_0^{xy})^t$, and in the same way for $\hat{b}^{xy}$.

Using the equations (9)(10)(11), we can write the relation between each derivative of the body trajectory (C, Ċ and C̈) and the command $\dddot{C}$:

$$C^{xy} = U_c \dddot{C}^{xy} + S_c \hat{c}^{xy} \quad (12)$$

$$\dot{C}^{xy} = U_{\dot{c}} \dddot{C}^{xy} + S_{\dot{c}} \hat{c}^{xy} \quad (13)$$

$$\ddot{C}^{xy} = U_{\ddot{c}} \dddot{C}^{xy} + S_{\ddot{c}} \hat{c}^{xy} \quad (14)$$

With:

$$U_c = \begin{pmatrix} \frac{T^3}{6} & 0 & 0 \\ \vdots & \ddots & 0 \\ \frac{(1-3N+3N^2)T^3}{6} & \cdots & \frac{T^3}{6} \end{pmatrix}, S_c = \begin{pmatrix} 1 & T & \frac{T^2}{2} \\ \vdots & \vdots & \vdots \\ 1 & NT & \frac{N^2T^2}{2} \end{pmatrix} \quad (15)$$

$$U_{\dot{c}} = \begin{pmatrix} \frac{T^2}{2} & 0 & 0 \\ \vdots & \ddots & 0 \\ \frac{(2N-1)T^2}{2} & \cdots & \frac{T^2}{2} \end{pmatrix}, S_{\dot{c}} = \begin{pmatrix} 0 & 1 & T \\ \vdots & \vdots & \vdots \\ 0 & 1 & NT \end{pmatrix}$$

$$U_{\ddot{c}} = \begin{pmatrix} T & 0 & 0 \\ \vdots & \ddots & 0 \\ T & \cdots & T \end{pmatrix}, S_{\ddot{c}} = \begin{pmatrix} 0 & 0 & 1 \\ \vdots & \vdots & \vdots \\ 0 & 0 & 1 \end{pmatrix}$$

The same way is used to define the dynamic of b. We can note that $U_c$, $U_{\dot{c}}$ and $U_{\ddot{c}}$ are invertible because they are squared lower triangular matrices with no zero in the diagonal.

Concerning p, using the equation (6), we can write this relation:

$$P^{xy} = U_{pc}\dddot{C}^{xy} + U_{pb}\dddot{B}^{xy} + S_{pc}\hat{c}^{xy} + S_{pb}\hat{b}^{xy} \quad (16)$$

With:

$$U_{pc} = \frac{m_c(gU_c - hU_{\ddot{c}})}{(m_c+m_b)g}, U_{pb} = \frac{m_b(gU_b - lU_{\ddot{b}})}{(m_c+m_b)g} \quad (17)$$

$$S_{pc} = \frac{m_c(gS_c - hS_{\ddot{c}})}{(m_c+m_b)g}, S_{pb} = \frac{m_b(gS_b - lS_{\ddot{b}})}{(m_c+m_b)g}.$$

Among different methods that can be used to solve the problem of determining such a control law fulfilling these position, robustness and dynamic behavior conditions, we have chosen to address it as an optimization problem. And to solve this optimization problem we have chosen to formulate it as a least square minimization under linear constraints or as a quadratic optimization with objectives and linear constraints. The main reason is that the solvers for this kind of problem are fast to compute. Adding non linear constraints or non quadratic minimization objectives increase significantly the computational time.

The optimization variables correspond to the controlled body and base $X = (\dddot{C}^x \dddot{C}^y \dddot{B}^x \dddot{B}^y)^t$. So each objective and constraint must be expressed as a function of X.

1) Control Objectives:

The objectives $O_i$ will be expressed as a least square minimization and a QP (Quadratic Problem) formulation: $O_i = \frac{1}{2}X^t Q_i X + p_i^t X$.

$X^t$ is X when transposed.

The first objective is the tracking control. In this control, we have chosen to do a position/velocity tracking. Let $B_{ref}^{xy}$ and $\dot{B}_{ref}^{xy}$ the position and velocity objective over the horizon. Using (13), we can write the velocity control objective $O_1$:

$$O_1 = \frac{1}{2}\|\dot{B}^{xy} - \dot{B}_{ref}^{xy}\| = \frac{1}{2}X^t Q_1 X + p_1^t X \quad (18)$$

-continued $$Q_1 = \begin{pmatrix} 0 & 0 & 0 & 0 \\ 0 & 0 & 0 & 0 \\ 0 & 0 & U_b^t U_b & 0 \\ 0 & 0 & 0 & U_b^t U_b \end{pmatrix}, p_1 = \begin{pmatrix} 0 \\ 0 \\ U_b^t(S_b\hat{b}^x - \dot{B}_{ref}^x) \\ U_b^t(S_b\hat{b}^y - \dot{B}_{ref}^y) \end{pmatrix} \quad (19)$$

Using (12) we can write the position control objective $O_2$:

$$O_2 = \frac{1}{2}\|B^{xy} - B_{ref}^{xy}\| = \frac{1}{2}X^t Q_2 X + p_2^t X \quad (20)$$

$$Q_2 = \begin{pmatrix} 0 & 0 & 0 & 0 \\ 0 & 0 & 0 & 0 \\ 0 & 0 & U_b^t U_b & 0 \\ 0 & 0 & 0 & U_b^t U_b \end{pmatrix}, p_2 = \begin{pmatrix} 0 \\ 0 \\ U_b^t(S_b\hat{b}^x - B_{ref}^x) \\ U_b^t(S_b\hat{b}^y - B_{ref}^y) \end{pmatrix} \quad (21)$$

The next objective is the robustness maximization. By minimizing $\zeta$ we maximize the robustness. Let $U_{pbb}=U_{pb}-U_b$. Using (8), (12), (16) we can write the robustness control $O_3$:

$$O_3 = \frac{1}{2}\zeta \simeq \frac{1}{2}\|\zeta_f(p-b) + (1-\zeta_f)(c-b)\| \quad (22)$$

$$O_3 = \frac{1}{2}X^t Q_3 X + p_3^t X \quad (23)$$

$$Q_3 = \zeta_f Q_{3p} + (1-\zeta_f)Q_{3c} \quad (24)$$

$$p_3 = \zeta_f p_{3p} + (1-\zeta_f)p_{3c} \quad (25)$$

$$Q_{3p} = \begin{pmatrix} U_{pc}^t U_{pc} & 0 & U_{pc}^t U_{pbb} & 0 \\ 0 & U_{pc}^t U_{pc} & 0 & U_{pc}^t U_{pbb} \\ U_{pbb}^t U_{pc} & 0 & U_{pbb}^t U_{pbb} & 0 \\ 0 & U_{pbb}^t U_{pc} & 0 & U_{pbb}^t U_{pbb} \end{pmatrix}$$

$$p_{3p} = \begin{pmatrix} U_{pc}^t((S_{pb}-S_b)\hat{b}^x + S_{pc}\hat{c}^x) \\ U_{pc}^t((S_{pb}-S_b)\hat{b}^y + S_{pc}\hat{c}^y) \\ U_{pbb}^t((S_{pb}-S_b)\hat{b}^x + S_{pc}\hat{c}^x) \\ U_{pbb}^t((S_{pb}-S_b)\hat{b}^y + S_{pc}\hat{c}^y) \end{pmatrix}$$

$$Q_{3c} = \begin{pmatrix} U_c^t U_c & 0 & -U_c^t U_b & 0 \\ 0 & U_c^t U_c & 0 & -U_c^t U_b \\ -U_b^t U_c & 0 & U_b^t U_b & 0 \\ 0 & -U_b^t U_c & 0 & U_b^t U_b \end{pmatrix}$$

$$p_{3c} = \begin{pmatrix} U_c^t(S_c\hat{c}^x - S_b\hat{b}^x) \\ U_c^t(S_c\hat{c}^y - S_b\hat{b}^y) \\ U_b^t(S_c\hat{c}^x - S_b\hat{b}^x) \\ U_b^t(S_c\hat{c}^y - S_b\hat{b}^y) \end{pmatrix}$$

Preferably, we define another objective to avoid peak of jerk on the robot; so we add a jerk minimization objective $O_4$ to the control:

$$O_4 = \frac{1}{2}\|X\| = \frac{1}{2}X^t Q_4 X + p_4^t X \quad (26)$$

$$Q_4 = \mathcal{I}, p_4 = 0 \quad (27)$$

Concerning this forth objective, we can note that when the robot falls, the trajectories of c and b grow exponentially. So by minimizing the jerk of these trajectories, we directly increase the avoidance of exponential divergence of c and b, which contributes to stabilize the robot.

2) Control Constraints:

In the following the constraints $R_i$ will be expressed as a QP linear inequality constraint formulation: $R_i: v_i^-\leq V_i X\leq v_i^+$.

Figure 4:
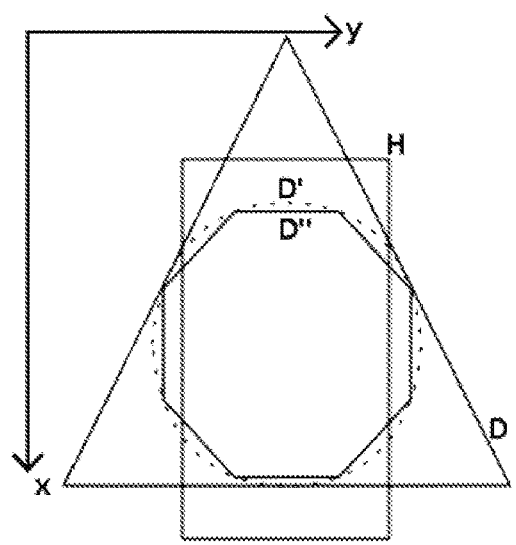
FIG. 4 illustrates a geometrical representation of the constraints.

The first constraint R1 is to assure stability: $\zeta$ must be lower or equal to 1. This constraint is not linear, so we introduce a conservative set of linear constraints to approximate this. We choose to use an octagonal shape of constraints $\mathbb{D}''$ inscribed in the circle $\mathbb{D}'$ as shown in FIG. 4: it defines a CoP limit constraint.

$$\rho = \frac{r}{\sqrt{10}}.$$

The constraint R1 is written as follows:

$$R_1: P^{xy} - B^{xy} \in \mathbb{D}'' \quad (28)$$

$$V_1 = \begin{pmatrix} U_{dc} & 0 & U_{pb}-U_b & 0 \\ 0 & U_{pc} & 0 & U_{pb}-U_b \\ U_{pc} & U_{pc} & U_{pb}-U_b & U_{pb}-U_b \\ U_{pc} & -U_{pc} & U_{pb}-U_b & -U_{pb}+U_b \end{pmatrix} \quad (29)$$

$$v_1^- = \begin{pmatrix} -3\rho - S_{pc}\hat{c}^x - (S_{pb}-S_b)\hat{b}^x \\ -3\rho - S_{pc}\hat{c}^y - (S_{pb}-S_b)\hat{b}^y \\ -4\rho - S_{pc}(\hat{c}^x + \hat{c}^y) - (S_{pb}-S_b)(\hat{b}^x + \hat{b}^y) \\ -4\rho - S_{pc}(\hat{c}^x - \hat{c}^y) - (S_{pb}-S_b)(\hat{b}^x - \hat{b}^y) \end{pmatrix}$$

$$v_1^+ = \begin{pmatrix} 3\rho - S_{pc}\hat{c}^x - (S_{pb}-S_b)\hat{b}^x \\ 3\rho - S_{pc}\hat{c}^y - (S_{pb}-S_b)\hat{b}^y \\ 4\rho - S_{pc}(\hat{c}^x + \hat{c}^y) - (S_{pb}-S_b)(\hat{b}^x + \hat{b}^y) \\ 4\rho - S_{pc}(\hat{c}^x - \hat{c}^y) - (S_{pb}-S_b)(\hat{b}^x - \hat{b}^y) \end{pmatrix}$$

The second constraint $R_2$ concerns the limits of the mobile base. Let $\dot{b}_{max}$ and $\ddot{b}_{max}$ the maximum velocity and acceleration of the mobile base. We can write the constraint $R_2$ as follows:

$$R_2: \begin{cases} -\dot{b}_{max}^{xy} \leq \dot{B}^{xy} \leq \dot{b}_{max}^{xy} \\ -\ddot{b}_{max}^{xy} \leq \ddot{B}^{xy} \leq \ddot{b}_{max}^{xy} \end{cases} \quad (30)$$

$$V_2 = \begin{pmatrix} 0 & 0 & U_{\dot{b}} & 0 \\ 0 & 0 & 0 & U_{\dot{b}} \\ 0 & 0 & U_{\ddot{b}} & 0 \\ 0 & 0 & 0 & U_{\ddot{b}} \end{pmatrix} \quad (31)$$

$$v_2^- = \begin{pmatrix} -\dot{b}_{max} - S_{\dot{b}}\hat{b}^x \\ -\dot{b}_{max} - S_{\dot{b}}\hat{b}^y \\ -\ddot{b}_{max} - S_{\ddot{b}}\hat{b}^x \\ -\ddot{b}_{max} - S_{\ddot{b}}\hat{b}^y \end{pmatrix}, v_2^+ = \begin{pmatrix} \dot{b}_{max} - S_{\dot{b}}\hat{b}^x \\ \dot{b}_{max} - S_{\dot{b}}\hat{b}^y \\ \ddot{b}_{max} - S_{\ddot{b}}\hat{b}^x \\ \ddot{b}_{max} - S_{\ddot{b}}\hat{b}^y \end{pmatrix}$$

The third and last constraint $R_3$ concerns the kinematic limits of the body. Due to its joints, the robot can move the CoM of its upper body in a rectangular zone $\mathbb{H}$ around the CoM of the mobile base. Let $k^{xy}$ the limits of the rectangular shape $\mathbb{H}$, the constraint $R_3$ is written as follows:

$$R_3: \quad -k^{xy} \leq c^{xy} - b^{xy} \leq k^{xy} \tag{32}$$

$$V_3 = \begin{pmatrix} U_c & 0 & -U_b & 0 \\ 0 & U_c & 0 & -U_b \end{pmatrix} \tag{33}$$

$$v_3^- = \begin{pmatrix} -k^x - S_c \hat{c}^x + S_b \hat{b}^x \\ -k^y - S_c \hat{c}^y + S_b \hat{b}^y \end{pmatrix}, v_3^+ = \begin{pmatrix} k^x - S_c \hat{c}^x + S_b \hat{b}^x \\ k^y - S_c \hat{c}^y + S_b \hat{b}^y \end{pmatrix}$$

The kinematic limits of the body can be null. Then we have:

$$c^{xy} = b^{xy}.$$

To solve this optimization problem with these objectives and constraints, we use a linear quadratic problem solver. Some literature about solving a QP can be found in the book "Numerical optimization, second edition" of J. Nocedal and S. J. Wright 2000. This kind of solver finds the optimal solution of a problem like this:

$$\begin{cases} \min_X (X^t Q X + p^t X) \\ v^- \leq V X \leq v^+ \end{cases} \tag{34}$$

where Q is symmetric and positive definite. Using the equations (19), (21), (25), (27), (29), (31), (33), we can fill the values of Q, p, V, $v^-$ and $v^+$:

$$Q = \alpha_1 Q_1 + \alpha_2 Q_2 + \alpha_3 Q_3 + \alpha_4 Q_4 + \alpha_5 Q_5 \tag{35}$$

$$p = \alpha_1 p_1 + \alpha_2 p_2 + \alpha_3 p_3 + \alpha_4 p_4 + \alpha_5 p_5 \tag{36}$$

$$V = \begin{pmatrix} V_1 \\ V_2 \\ V_3 \end{pmatrix}, v^+ = \begin{pmatrix} v_1^+ \\ v_2^+ \\ v_3^+ \end{pmatrix}, v^- = \begin{pmatrix} v_1^- \\ v_2^- \\ v_3^- \end{pmatrix} \tag{37}$$

where $\alpha_i$ are the weightings associated to each objective. They can be chosen experimentally.

The choice of the $\alpha_i$ values is primordial to define the behavior of the control law. The relative gap between each $\alpha_i$ defines which objective will be prioritized, and which will be neglected. If $\alpha_1$ and $\alpha_2$ are greater than the other weightings, the trajectory tracking will be very efficient, but the robustness will be less efficient, and the jerk of the body and of the base can be high. If $\alpha_3$ is greater than the other weightings, the robot will be very robust to strong disturbances. We can note that in this mode of behavior, if we define a positive velocity as tracking objective, the robot will start backwards before moving forward, in order to center the CoP. The weighting $\alpha_4$ has a smoothing effect on the trajectories of c and b, if this weighting is greater than the other, the optimal solution will be not to move. Thereby, this weighting must be small.

Some other behaviors can be obtained by choosing adequate weightings. If the relative gap between two objectives is large (several orders of magnitude), the smaller objective will be computed almost in the null-space of the larger one. Using this property is useful when we want to have a pseudo constraint which can be relaxed if it cannot be satisfied. For example, we can add a high-weighted objective of the CoM of the upper body to center it to the mobile base position in order to have a nice visual behavior. This will have the effect of fixing the CoM at the mobile base position whenever possible, but, in case this is not possible, this pseudo-constraint will be relaxed.

The weighting set can be fixed, which means that we have chosen in advance if we want to have a better trajectory tracking or robustness.

Referring to FIG. 2, the robot model and the control law are stored as a behavior 221; they are implemented by the execution engine 240 and by the service module 210 according to a closed-loop scheme comprising the following steps:
retrieving position measure of the body and position measure of the base, from sensors,
converting these position measures in observed position measures, using extractors 211,
calculating in a system service 213, body velocity and base velocity commands using the previously described control law,
integrating these body and base velocities, to provide them to the extractors 211,
converting these commands (position and velocity for the body and for the base) as instructions for the robot actuators 212: the wheels of the base and joints of the robot.

In order to validate this control law, some experiments have been conducted; they are described in relation with FIGS. 5. The controller presented here has been implemented in closed-loop on a humanoid robot; the feedback is given by setting, each time, the value of the initial states $\hat{c}^{xy}$ and $\hat{b}^{xy}$. This values are measured, for $\hat{b}^{xy}$ by a position sensor of each wheel angle, and for $\hat{c}^{xy}$ by a position sensor on each robot joint. Due to the three sensors on the mobile base, the real position of the robot in the world $b_0^{xy}$ can only be known when supposing that the wheels do not slip on the ground. We have chosen a material for the ground and the wheels ensuring this assumption. Concerning the controller, we have empirically chosen a predicted-time length of 2s and a sampling period T of 100 ms. The number of sample N is then 20.

In the four experiments, a position/velocity reference has been sent to the controller with the form: go forward at constant speed, and half-way through the trajectory, change the trajectory direction. The position reference and the velocity reference are included in the trajectory reference. This trajectory cannot be carried out by the robot because it needs an infinite acceleration to change instantaneously the velocity direction. So the controller has to deal with that by computing an optimal and feasible trajectory according to the defined weighting set.

Figure 5A:
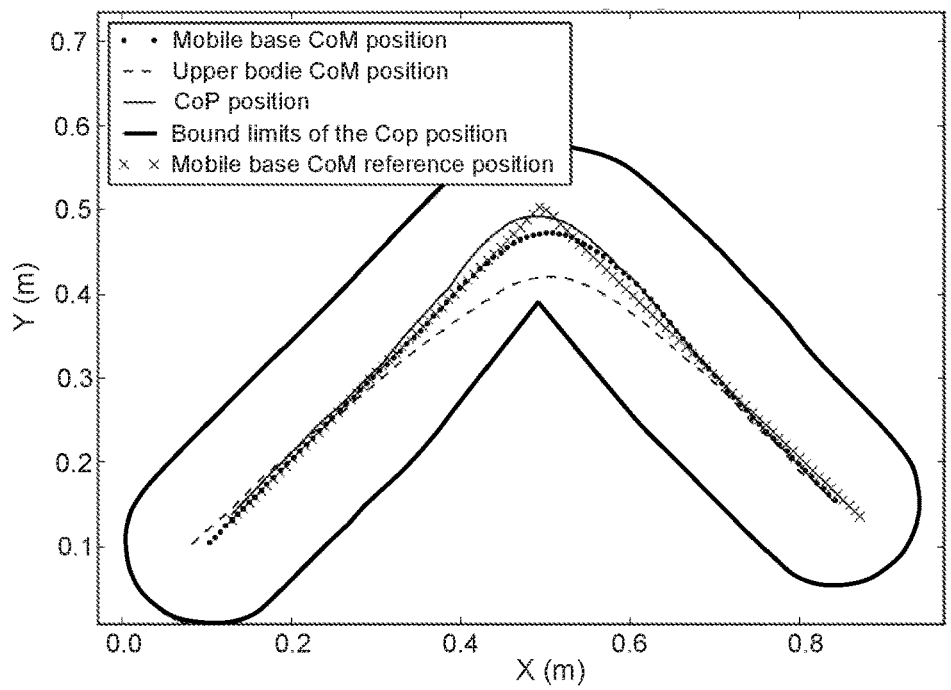
FIGS. 5a-5d display x,y trajectories of the mobile base CoM (Center of Mass), of the upper body CoM, of the CoP, with the bounds limits of the CoP position and the mobile base CoM reference position for four different experiments (FIG. 5a, FIG. 5b, FIG. 5c and FIG. 5d).

The experiment 1 with results shown FIG. 5a, corresponds to prioritizing the trajectory tracking over the robustness: $\alpha_1, \alpha_2 > \alpha_3$. In this example $\alpha_1 = \alpha_2 = 100$, $\alpha_3 = 10$, $\alpha_4 = 0.0001$. Firstly, we can see the effect of the prediction in the controller half-way through the trajectory. The mobile base starts to turn before the change of the reference trajectory. The goal is to better minimize the tracking error in the whole predicted time. We can also see that the CoM of the upper body is largely into the mobile base trajectory curve. The controller has done that in order to optimize the robustness in the whole predicted time by minimizing the distance between the CoP and the mobile base CoM. At last, we can see at the end of the trajectory that there is no finite convergence of the tracking in position. This is due to the absence of a position-integral objective.

Figure 5B:
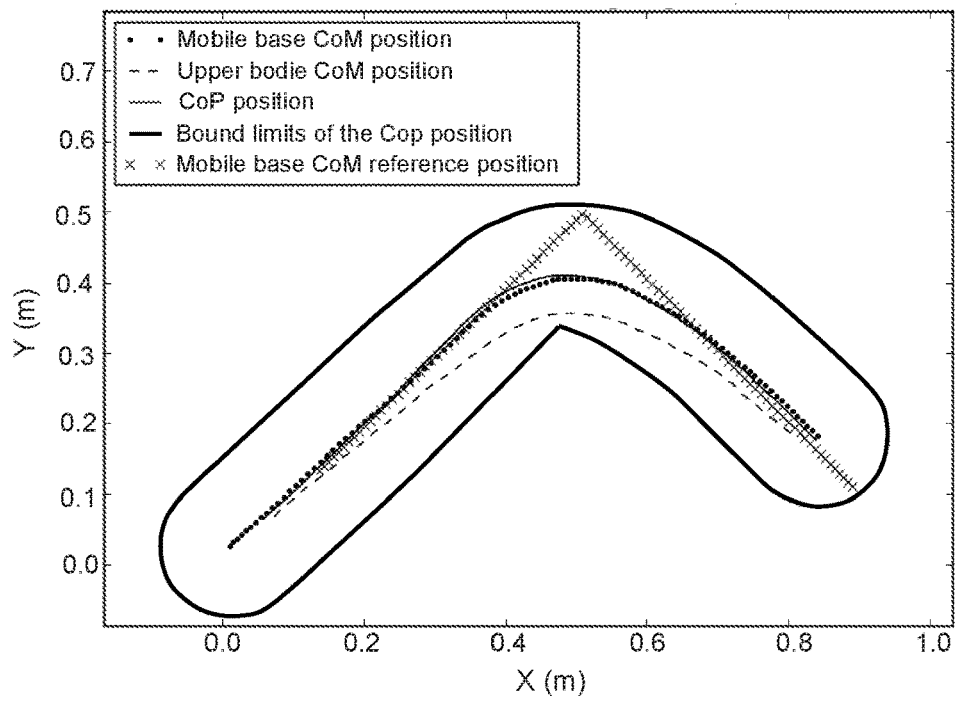

The experiment 2 with results shown FIG. 5b, corresponds to prioritizing the robustness over the trajectory tracking: $\alpha_3 > \alpha_1$, $\alpha_2$. In this example $\alpha_1 = \alpha_2 = 100$, $\alpha_3 = 500000$, $\alpha_4 = 0.0001$. We can see that the distance between the CoP and the mobile base CoM is significantly smaller, in comparison to the experiment 1. As we cannot have both a good tracking and a good robustness, we can note that the trajectory tracking is worse around the problematic point in the middle of the trajectory. The important thing to remember is that, with a constant set of weights, we have to reach a compromise between the robustness and the trajectory tracking, when the robot cannot do both at the same time.

Figure 5C:
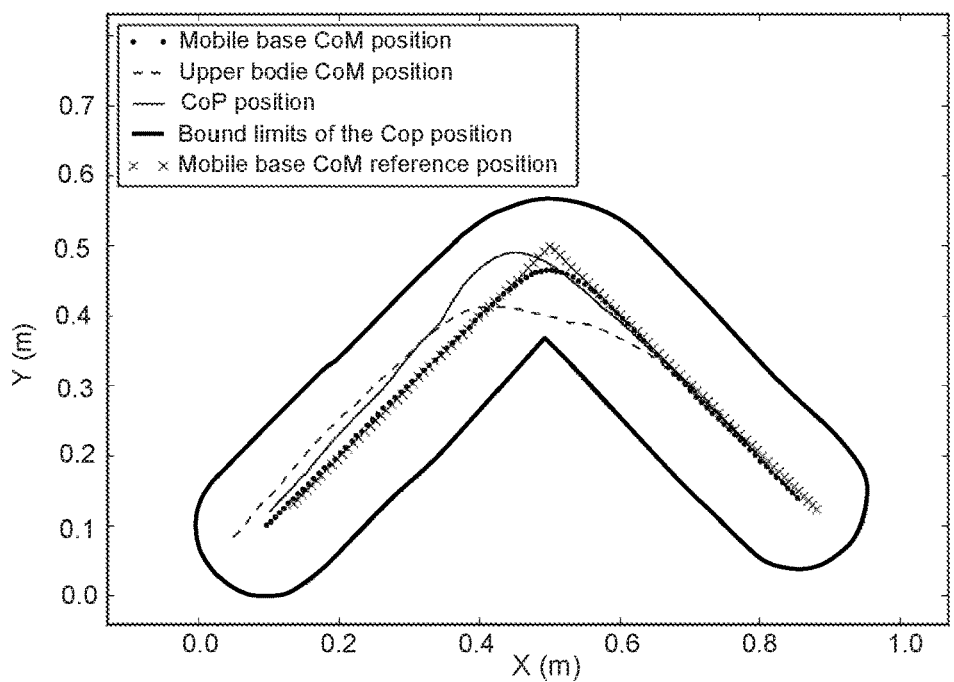

The experiment 3 with results shown FIG. 5c, corresponds to the weighting set of the first experiment, but with a 1-mass model, instead of a 2-mass model. We can note that the mobile base trajectory tracking remains the same, but, due to the worse model, the whole body and base CoM have less DoF to try to optimize the robustness. This results in a worse behavior of the upper body, by moving faster and with a larger move, at the wrong time. We can note that at high speed for this robot, the 1-mass model is not stable and the robot falls, while the 2-mass model stay stable. In this example $\alpha_1 = \alpha_2 = 100$, $\alpha_3 = 10$, $\alpha_4 = 0.0001$.

Figure 5D:
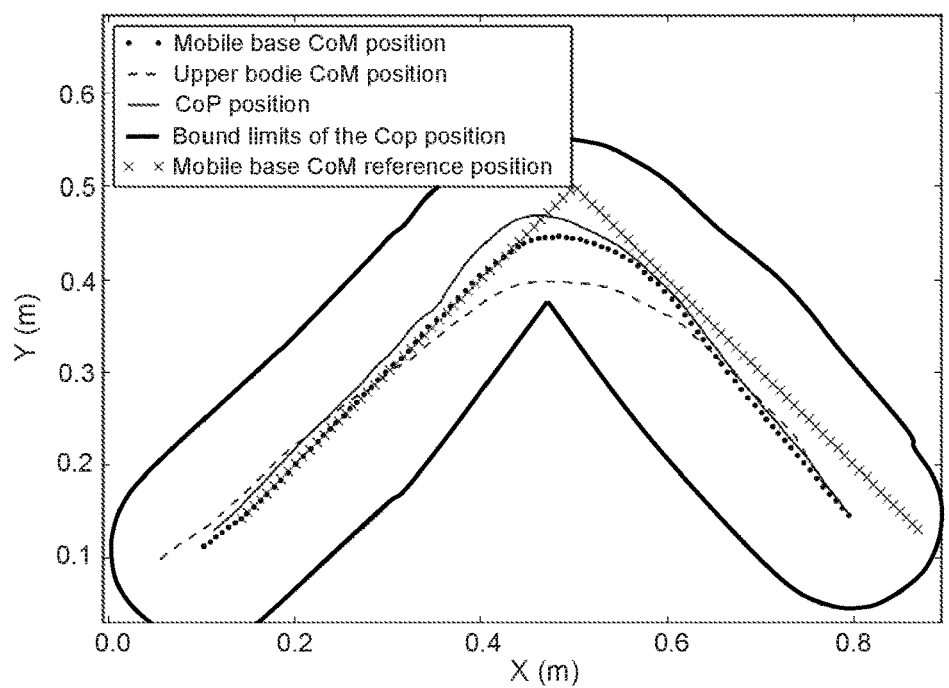

The experiment 4 with results shown FIG. 5d, corresponds to the weighting set of the first experiment, with a 2-mass model but in an open-loop (it corresponds to set directly b and c to their respective commands). We can obviously see that the robot has many drifts and cannot follow the reference trajectory. We can also note that the measured behavior of the robot is more jerky than in a closed-loop. It also has an effect of smoothing the trajectories of the robot. In this example $\alpha_1 = \alpha_2 = 100$, $\alpha_3 = 10$, $\alpha_4 = 0.0001$.

We have described a new controlled robot with an omnidirectionnal mobile base. The advantages of the robot's controller are:
- the concept of time-prediction, which allows high constrained dynamic system to be controlled at high speed and acceleration, predicting their future behaviors;
- the high modularity, which allows to have many choices between prioritizing the trajectory tracking, optimizing the robustness if the robot is severely disrupted, or minimizing the jerk to protect the mechanical parts of the robot;
- the possibility to manage any set of linear constraint as kinematic limits, stability or robustness limitations, and mobile base limitations.

The invention claimed is:

1. A humanoid robot with a body joined to an omnidirectionnal mobile ground base, and equipped with:
   - a body position sensor and a base position sensor to provide measures,
   - actuators comprising joints motors and at least 3 wheels located in the omnidirectionnal mobile base, with at least 1 omnidirectional wheel,
   - extractors for converting the measures into observed data,
   - a controller to calculate position, velocity and acceleration commands from the observed data using a robot model and pre-ordered position and velocity references,
   - means for converting the commands into instructions for the actuators, wherein the robot model is a double point-mass model, and wherein the commands are based on a linear model predictive control law with a discretized time according to a sampling time period and a number of predicted samples, and expressed as a quadratic optimization formulation with:
   a weighted sum of:
      a base position objective,
      a base velocity objective,
      an objective related to the distance between the CoP and the base center, CoP being the barycenter of contact forces between the robot and the ground,
   with predefined weights and a set of predefined linear constraints which are:
      a maximum velocity and acceleration of the mobile base,
      a CoP limit.

2. The humanoid robot of claim 1, wherein a weighted numerical stability objective is added to the weighted sum of objectives.

3. The humanoid robot of claim 1, wherein the set of predefined linear constraints comprise kinematic limits of the body.

4. A method for controlling a humanoid robot with a body joined to an omnidirectionnal mobile ground base and actuators comprising at least 3 wheels located in the omnidirectionnal mobile base, with at least 1 omnidirectional wheel, comprising the following steps implemented according to a closed-loop scheme:
   retrieving position measure of the body and position measure of the base,
   converting these position measures in observed position measures,
   calculating body velocity and base velocity commands using a control law based on a linear model predictive control law with a discretized time according to a sampling time period and a number of predicted samples, and expressed as a quadratic optimization formulation with a weighted sum of
      a base position objective,
      a base velocity objective,
      an objective related to the distance between the CoP and the mobile base center, CoP being the barycenter of contact forces between the robot and the ground,
   with predefined weights and a set of linear constraints which are
      a maximum velocity and acceleration of the mobile base,
      a CoP limit,
   converting these commands into instructions for the robot actuators.

5. The method of claim 4, wherein the set of predefined linear constraints comprise kinematic limits of the body.

6. The method of claim 4, wherein a weighted numerical stability objective is added to the weighted sum of objectives.

7. A non-transitory computer readable storage medium containing a computer program comprising computer code instructions configured to execute on a computer the method of claim 4.

* * * * *